No. 736,874. PATENTED AUG. 18, 1903.
M. QUINN.
TONGS.
APPLICATION FILED JUNE 24, 1902.
NO MODEL.
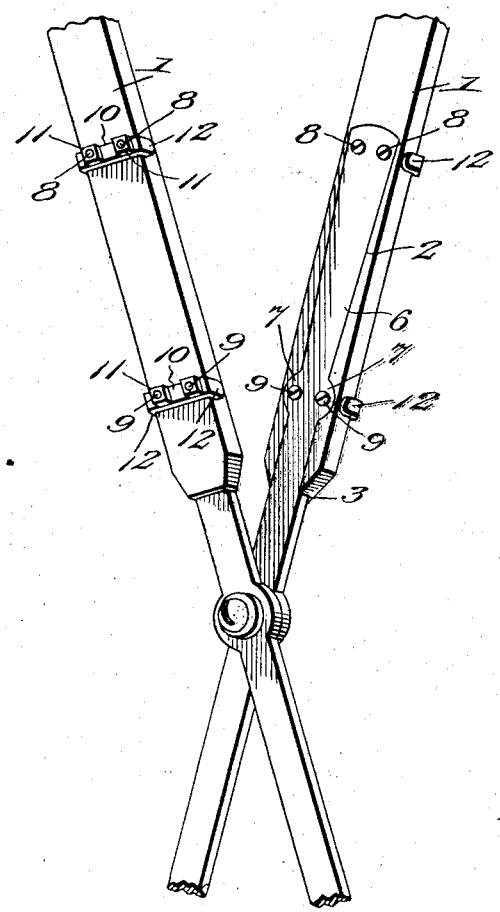
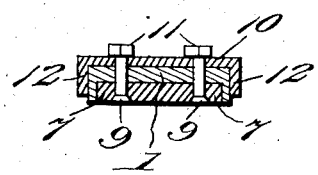
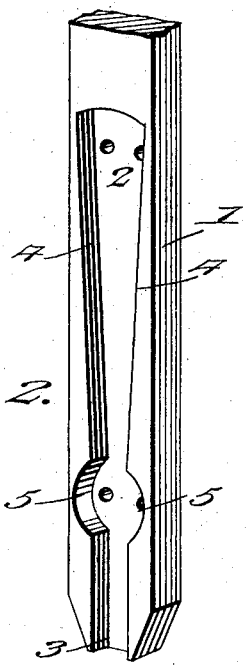
Witnesses
Edwin G. McKee
Inventor
Martin Quinn
By Victor J. Evans
Attorney No. 736,874.

Patented August 18, 1903.

UNITED STATES PATENT OFFICE.

MARTIN QUINN, OF BLACKROCK, ARKANSAS.

TONGS.

SPECIFICATION forming part of Letters Patent No. 736,874, dated August 18, 1903.

Application filed June 24, 1902. Serial No. 113,026. (No model.)

*To all whom it may concern:*

Be it known that I, MARTIN QUINN, a citizen of the United States, residing at Blackrock, in the county of Lawrence and State of Arkansas, have invented new and useful Improvements in Tongs, of which the following is a specification.

My invention has relation to new and useful improvements in tongs and similar implements; and the primary object of the invention is to provide a device of the character described which will be simple in construction, durable, and efficient in use, and wherein will be embodied a novel means for uniting the shanks proper of the tongs to the handles by which the implement is manipulated.

A further object is to provide, in connection with the means for uniting the shanks and the handles, a simple device whereby the splitting of the handles is prevented when the implement is subjected to excessive strain.

The invention consists in the improved implement to be more fully described hereinafter and the novelty of which will be particularly pointed out and distinctly claimed.

I have fully and clearly illustrated my invention in the accompanying drawings, wherein—

Figure 1 is a detail perspective view showing the shanks of a tongs connected to the handles in accordance with my invention. Fig. 2 is a detail perspective view of one of the handles, showing the seat for the shank of the tongs. Fig. 3 is a section taken on the line $y\ y$ of Fig. 1.

Referring to the drawings, 1 1 designate the lower ends of duplicate operating-handles for the tongs, said handles being of such form and material as to best adapt them to the uses to which they may be put and of sufficient strength to stand the strain thereon when the implement is employed to grasp and lift a body having considerable weight. In the inner face of each handle-piece and at the lower end thereof is formed a cut-out portion constituting a depression or seat 2, extending for such a distance upwardly on the said handle and of such width and depth as may be requisite to hold and retain the shanks of the jaws. Each of these depressions is open at the end of the handle-piece, as at 3, and is formed with inwardly flaring or diverging sides or walls 4. At any desired point intermediate their ends these walls 4 are formed with oppositely-arranged and outwardly-extending recesses 5 5, which may be of any form suitable to accomplish the purposes for which they are intended.

Within the depressions or seats 2 are seated and secured the rear ends of the shanks of the tongs. These shanks are made of coincident edge contour to the depressions or seats, being tapered downwardly from the end of the shanks, as at 6, and are formed with laterally-extending ears or projections 7 7 to fit the outwardly-extending recesses in the side walls of the seats 2.

It will be seen that the improved form of socket shown and described and the manner of seating the shanks therein provides an efficient means for preventing the longitudinal displacement of the shanks from the handles.

To securely lock the shanks of the tongs within the seats 2, I employ bolts 8 or some such similar fastening means, two of which are projected through alining apertures formed, respectively, in the handle within the upper end of the seat 2 and in the rear end of the shank of the tongs. Extending through apertures formed in each of the laterally-projecting ears 7 7 and corresponding apertures in the recesses 5 5 are two similar bolts 9 9, substantially as shown in Fig. 1 of the drawings.

Both sets of bolts above referred to are of sufficient length to project a considerable distance beyond the outer face of the handle-piece 1, and placed over the said bolts are plates 10 10, which plates are provided with suitable openings through which the ends of the bolts project, said bolts having threaded thereon clamping-nuts 11, by means of which the shanks of the tongs and the handle-pieces are drawn tightly together and the plates 10 10 securely clamped to the handle-piece. These plates are arranged transversely of the handle-pieces and have their outer free ends bent downwardly, as at 12, to grasp the edges of the handle-pieces and form an efficient means to prevent the said handles from splitting when they are subjected to excessive strain.

It will be seen from the foregoing description, taken in connection with the drawings, that I have devised a simple and efficient means for securing the shanks to the handles, whereby the longitudinal displacement of the shanks is obviated, the said shanks are securely held within the seats in the handles, and the splitting of the handles is prevented.

What I claim is—

1. In an implement of the character described, a handle having a seat with inwardly-diverging side walls, a shank within the seat and conforming to the contour thereof, means to clamp the shank in position, and means embracing the outer side of the handle to prevent splitting of the latter when subjected to strain.

2. In an implement of the character described, a handle having a seat with inwardly-diverging side walls, a shank within the seat and conforming to the contour thereof, means to clamp the shank in position having parts extending through the handle and shank, said clamping means comprising devices to prevent the splitting of the handle when subjected to strain.

3. In an implement of the character described, a handle having a seat formed with flaring side walls, and recesses formed in the said walls, a shank within the said seat and conforming in contour thereto, means to clamp the shanks in position and means to prevent the splitting of the handle when subjected to strain.

4. In an implement of the character described a handle having a seat formed with flaring side walls, and recesses in the said walls, a shank within the said seat and conforming in contour thereto, and means to clamp the shank in position.

5. In an implement of the character described, a handle having a seat formed with flaring side walls, and recesses in the said walls, a shank within the seat and having tapering sides conforming to the seat and projections to register with the recesses therein, bolts securing the shank in position and means held by the bolts to prevent splitting of the handle when subjected to strain.

6. In an implement of the character described, a handle formed with a seat, a shank within the seat and conforming to the contour thereof, means to clamp the shank in position, and a plate secured to said clamping means and formed to engage the handle and prevent it from splitting when subjected to strain.

7. In an implement of the character described, a handle having a seat, a shank within the seat and conforming to the contour thereof, bolts to secure the shank in position and a plate secured to the bolts and having end portions bent to engage the sides of the handle and prevent it from splitting when subjected to strain.

In testimony whereof I affix my signature in presence of two witnesses.

MARTIN QUINN.

Witnesses:
JAMES W. McPHINK,
WILLIAM RUTLEDGE.